United States Patent
Andreani et al.

(10) Patent No.: US 9,382,164 B2
(45) Date of Patent: Jul. 5, 2016

(54) MATERIALS AND PARTS THAT CAN WITHSTAND HIGH TEMPERATURES IN AN OXIDIZING MEDIUM, AND METHOD FOR MANUFACTURING SAME

(75) Inventors: Anne-Sophie Andreani, La Vallee (FR); Francis Rebillat, Merignac (FR); Angeline Poulon, Arsac (FR); Jacques Thebault, Bordeaux (FR); Anne Sauveroche, Le Pian Medoc (FR)

(73) Assignees: CENTRE NATIONAL DE LA RECHERCHE SCIENTIFIQUE, Paris (FR); HERAKLES, Le Haillan (FR)

( * ) Notice: Subject to any disclaimer, the term of this patent is extended or adjusted under 35 U.S.C. 154(b) by 215 days.

(21) Appl. No.: 13/992,880

(22) PCT Filed: Dec. 5, 2011

(86) PCT No.: PCT/FR2011/052867
§ 371 (c)(1),
(2), (4) Date: Nov. 22, 2013

(87) PCT Pub. No.: WO2012/076797
PCT Pub. Date: Jun. 14, 2012

(65) Prior Publication Data
US 2014/0072805 A1 Mar. 13, 2014

(30) Foreign Application Priority Data
Dec. 10, 2010 (FR) ..................... 10 60361

(51) Int. Cl.
*C04B 41/50* (2006.01)
*C04B 35/505* (2006.01)
(Continued)

(52) U.S. Cl.
CPC ............. *C04B 35/505* (2013.01); *C04B 35/515* (2013.01); *C04B 35/5156* (2013.01);
(Continued)

(58) Field of Classification Search
USPC .......... 264/603; 428/408, 699, 701, 702, 704; 501/96.3
See application file for complete search history.

(56) References Cited

U.S. PATENT DOCUMENTS

| | | | | |
|---|---|---|---|---|
| 3,019,128 A | * | 1/1962 | Smiley | .......... 428/469 |
| 3,437,606 A | * | 4/1969 | Mercuri | .......... C04B 35/58071 501/96.3 |

(Continued)

FOREIGN PATENT DOCUMENTS

| | | | |
|---|---|---|---|
| JP | S55-128560 A | | 10/1980 |
| JP | 06-248446 | * | 9/1994 |

(Continued)

OTHER PUBLICATIONS

Kim et al: "The effect of lanthanum on the fabrication of ZrB2—ZrC composites by spark plasma sintering", Materials Characterization, vol. 50, No. 1, Jan. 1, 2003, pp. 31-37.

(Continued)

*Primary Examiner* — Archene Turner
(74) *Attorney, Agent, or Firm* — Workman Nydegger

(57) ABSTRACT

A refractory material that can withstand high temperatures in an oxidizing medium and containing at least:
- a first constituent corresponding to hafnium, or to a non-oxide compound of hafnium, or circular in a or a non-oxide compound of zirconium, or corresponding to a mixture of at least two metals and/or compounds selected from hafnium a non-oxide compound of hafnium, zirconium, and a non-oxide compound of zirconium;
- a second constituent corresponding to the boron or to a non-oxide compound of boron, or corresponding to a mixture of boron and a non-oxide compound of boron; and
- a third constituent corresponding to a rare earth RE or to a non-oxide compound of the rare earth RE, or corresponding to a mixture of rare earth RE and a non-oxide compound of the rare earth RE, where RE is selected from scandium, yttrium, and the lanthanides.

The material contains neither silicon nor a compound of silicon.

20 Claims, 2 Drawing Sheets

(51) Int. Cl.
| | |
|---|---|
| *C04B 35/515* | (2006.01) |
| *C04B 35/56* | (2006.01) |
| *C04B 35/58* | (2006.01) |
| *C04B 35/66* | (2006.01) |
| *C04B 41/00* | (2006.01) |
| *C04B 41/51* | (2006.01) |
| *C04B 41/87* | (2006.01) |
| *C04B 41/88* | (2006.01) |

(52) U.S. Cl.
CPC ....... *C04B35/5622* (2013.01); *C04B 35/58078* (2013.01); *C04B 35/66* (2013.01); *C04B 41/009* (2013.01); *C04B 41/5057* (2013.01); *C04B 41/5133* (2013.01); *C04B 41/87* (2013.01); *C04B 41/88* (2013.01); *C04B 2235/3804* (2013.01); *C04B 2235/3813* (2013.01); *C04B 2235/3839* (2013.01); *C04B 2235/3852* (2013.01); *C04B 2235/666* (2013.01); *C04B 2235/728* (2013.01); *C04B 2235/9684* (2013.01); *F05D 2300/123* (2013.01); *F05D 2300/134* (2013.01); *F05D 2300/135* (2013.01); *F05D 2300/15* (2013.01); *Y10T 428/30* (2015.01)

(56) References Cited

U.S. PATENT DOCUMENTS

| | | | |
|---|---|---|---|
| 4,259,119 A | | 3/1981 | Watanabe et al. |
| 4,546,089 A | * | 10/1985 | Wusirika ................ C04B 35/58 501/96.3 |
| 5,254,397 A | * | 10/1993 | Kawai et al. .................. 428/408 |
| 5,420,084 A | | 5/1995 | Morel |
| 6,632,762 B1 | * | 10/2003 | Zaykoski et al. ................ 501/92 |
| 8,323,796 B2 | * | 12/2012 | Schmidt et al. ................ 428/408 |
| 8,426,043 B2 | * | 4/2013 | Andrews et al. ................ 428/702 |
| 2008/0026207 A1 | | 1/2008 | Fink-Petri et al. |
| 2010/0239885 A1 | | 9/2010 | Nakamura |

FOREIGN PATENT DOCUMENTS

| | | |
|---|---|---|
| JP | H08-310867 A | 11/1996 |
| JP | 2001-261440 A | 9/2001 |
| JP | 2008-031039 A | 2/2008 |
| JP | 2010-248060 A | 11/2010 |
| WO | 2008/132672 | 11/2008 |

OTHER PUBLICATIONS

Chen C M et al: "High temperature oxidation of LaB6-ZrB2 eutectic in situ composite", Acta Materialia, Elsevier, Oxford, GB, vol. 47, No. 6, Apr. 23, 1999, pp. 1945-1952.

McKee et al: "Oxidation behavior and protection of carbon/carbon composites", Carbon, Elsevier, Oxford, GB, vol. 25, No. 4, Jan. 1, 1987, pp. 551-557.

Li et al: "Effect of Rare Earth Elements on the Valence Electron Structure and Properties of ZrB2 Ceramics", Science of Advanced Materials, vol. 1, No. 3, Dec. 3, 2009, pp. 269-275.

Peng: "Oxidation resistance of fully dense ZrB2 with SiC, TaB2, and TaSi2 additives", Journal of the American Ceramic Society, vol. 91, No. 5, Jan. 1, 2008, p. 1489-1494.

Courtright et al: "Oxidation of hafnium carbide and hafnium carbide with additions of tantalum and praseodymium", Oxidation of Metals, vol. 36, No. 5-6, Dec. 1, 1991, pp. 423-437.

Song et al: "Influence of Sintering Conditions on Densification of YAG—ZrB2 Multi-phase Ceramics with Spark Plasma Sintering", Journal of Reinforced Plastics and Composites, vol. 29, No. 5, Mar. 1, 2010, pp. 710-717.

International Search Report for PCT/FR2011/052867conducted by International Search Authority European Patent Office on Mar. 5, 2012.

Japanese 1st Office Action from JP Patent Application No. 2013-542585, May 26, 2015.

Guzman, I.Y., "A Chemical Technology of Ceramics", Moscow, OOO RIF "Stroymaterialy", pp. 364-365, 2003.

\* cited by examiner

MATERIALS AND PARTS THAT CAN WITHSTAND HIGH TEMPERATURES IN AN OXIDIZING MEDIUM, AND METHOD FOR MANUFACTURING SAME

BACKGROUND OF THE INVENTION

The invention relates to making material that can withstand high temperatures in an oxidizing medium, in particular in the presence of air, steam, and more generally in the presence of any gaseous or liquid phase that contains oxygen or a compound of oxygen.

The invention relates in particular to making a refractory material part that is suitable for providing protection capable of withstanding high temperatures in an oxidizing medium. The invention also relates to providing protection against high temperatures in an oxidizing medium to thermostructural composite materials that are made at least in part out of carbon, with the fibers constituting the fiber reinforcement of such materials generally being carbon fibers, and it also being possible for the matrix densifying such materials to be made in part or in full out of carbon, or else out of a material other than carbon. The invention relates more particularly, but not exclusively, to carbon/carbon (C/C) thermostructural composite materials that are constituted by carbon fiber reinforcement densified by a carbon matrix.

Thermostructural composite materials are characterized by their mechanical properties that make them suitable for constituting structural parts, and by their ability to conserve those mechanical properties at high temperatures. Nevertheless, when they contain carbon, composite materials present the major drawback of oxidizing from 400° C. in air or in an oxidizing medium, and of losing their thermostructural properties in part.

For temperatures below 2000° C., there presently exist numerous anti-oxidation protective coatings for parts that are made at least in part out of carbon or graphite. The table below gives examples of protective coatings that can be used as a function of the maximum temperature of use under consideration.

| Maximum utilization temperature | Anti-oxidation protection |
|---|---|
| 700° C. | $B_2O_3$ |
| 850° C. | $Zn_2P_2O_7$ |
| 1250° C.–1300° C. | SiC + (barium aluminum borosilicate (SABB) + $MoSi_2$) + (SABB + $Y_2O_3$) |
| 1500° C. | Silicates of yttrium |
| | SiC + (magnesium aluminum borosilicate (SABM) + $MoSi_2$) |
| | SiC + $Al_2O_3$ + mullite |
| 1600° C. | SiC + Silicates of yttrium + $SiO_2C$ + SiC + $Si_3N_4$ |
| 1700° C.–1800° C. | Silicon nitride |
| | Silicon carbide |

Nevertheless, above the temperatures specified in the above table, and a fortiori at above 2000° C., several phenomena can arise that are harmful to the effectiveness of the protection. Mention may be made in particular of problems of oxides presenting thermal and mechanical instability, poor protection against diffusion of oxygen, and separation between the coating and the substrate leading to oxidation along the interface between the carbon substrate that is to be protected and the protective coating.

No simple system satisfies all of those constraints. Multiphase systems have been envisaged for protecting thermostructural composite materials (e.g. C/C) at high temperatures, such as, in particular, hafnium di-boride ($HfB_2$) or zirconium di-boride ($ZrB_2$) as described in document U.S. Pat. No. 5,420,084, and they have been found to be good candidates for protective materials since they possess the following qualities in particular:

melting temperatures of about 3200° C.;
low specific gravity (6.09 and 10.5);
high hardness;
high electrical and thermal conductivity;
high resistance to thermal shock; and
good resistance to oxidation at high temperatures.

In an oxidizing atmosphere, $ZrB_2$ and $HfB_2$ form a refractory oxide that is porous at a temperature higher than 2000° C. and a liquid phase $B_2O_3$ (melting temperature about 450° C.). Nevertheless, that liquid phase $B_2O_3$ evaporates almost completely when the temperature is higher than 1800° C. In order to lead to a less volatile liquid phase being formed, the refractory compound SiC (Td=2730° C.) has been added to $ZrB_2$ and $HfB_2$ so as to obtain a fluid borosilicate that is more stable at high temperature, while still possessing the ability to flow into the pores of the refractory oxide layer. By adding SiC to $HfB_2$ and $ZrB_2$, the oxidation of those compounds leads to a porous refractory skeleton made of $HfO_2$ or $ZrO_2$ that withstands high temperatures and that is coated on its surface in a viscous liquid phase constituted by $SiO_2$, which has the property of reducing the quantity of oxygen diffusing through the oxide layer, and consequently of reducing the rate at which the protective material oxidizes.

The melting temperature of silica is about 1700° C. and its boiling temperature is 2700° C. At temperatures higher than 2000° C., silica is in liquid form. Numerous studies have shown that the formation of the initial layer of $SiO_2$ takes place very quickly (quasi-instantaneous nucleation). In addition, the oxidation reaction gives rise to a large increase in the volume of the material associated with the variation in the molar volume of one mole of $SiO_2$ compared with one mole of SiC. Furthermore, its coefficient of thermal expansion is small, thereby providing good thermal compatibility with the other refractory oxide layers that are present having coefficients of thermal expansion that are often much higher than that of the composite material. This significant increase in volume and the low permeability of oxygen in silica explain the protective nature of $SiO_2$, which constitutes an effective barrier against diffusion of oxygen. This constitutes a particular example of passive oxidation.

Among the various systems that are fabricated by mixing $(Zr/Hf)B_2$ and SiC, the system comprising 20% by volume of SiC (i.e. a (Zr or Hf)/Si atomic ratio equal to 2.7) presents a good compromise between adhesion to the composite material containing carbon and resistance to oxidation. Adhesion is enhanced by chemical and thermomechanical compatibility between the composite material and its coating. The low coefficient of thermal expansion of SiC is close to that of carbon. Adding SiC thus makes it possible to improve thermomechanical compatibility and thus avoid microcracks appearing. Nevertheless, under a wet or dry oxidizing atmosphere and/or at high temperature, silica evaporates and growth of this passive layer becomes very limited. Thus, at low pressure, it is possible for a transition to occur from passive oxidation to active oxidation of the SiC.

At a temperature higher than 2000° C., effective protection of such systems is weakened because of the active oxidation of silicon carbide producing gaseous SiO and leading to reopening of the pores in the refractory oxide skeleton containing at least $HfO_2$ or $ZrO_2$.

There exists a need to protect parts that are used in an oxidizing medium at temperatures higher than 2000° C.

This applies in particular to rocket engine components or to components of aeroengines of the turbojet type in which the steam and the carbon dioxide that are produced and ejected through the nozzle create an environment that is wet and oxidizing. This protection problem also arises for vehicle heat shields for re-entry into the atmosphere.

OBJECT AND SUMMARY OF THE INVENTION

An object of the invention is to provide a refractory material that can withstand high temperatures, in particular that can withstand oxidation at temperatures higher than or equal to 2000° C., under conditions of pressure lying in the range very low pressure (≥1 pascals (Pa)) up to higher values (>30 megapascals (MPa)).

This object is achieved by a material characterized in that it contains at least:
- a first constituent corresponding to hafnium, or to a non-oxide compound of hafnium, or corresponding to a mixture of at least two of these metals and/or compounds;
- a second constituent corresponding to the boron or to a non-oxide compound of boron, or corresponding to a mixture of boron and a non-oxide compound of boron; and
- a third constituent corresponding to a rare earth RE, RE designating a rare earth comprising yttrium (Y), scandium (Sc), and the lanthanides, or to a non-oxide compound of the rare earth RE, i.e. a carbide, a boride, or a nitride of the rare earth, or corresponding to a mixture of the rare earth RE and a non-oxide compound of the rare earth RE; and
- in that said material contains neither silicon nor a compound of silicon.

As explained above, such a material constitutes a non-oxide system in which silicon is advantageously replaced by a third constituent that is not subjected to active oxidation while nevertheless conserving a self-healing liquid phase because of the presence of $B_2O_3$ and/or the possible formation of a liquid oxide of the third constituent. In addition, the material of the invention presents a very good refractory nature since, in the protective oxide layer, the oxide of the third constituent forms a complex containing an oxide of hafnium, an oxide, a defined (or intermediate) compound, a solid solution, or an over-structure that enables the thermomechanical stability of the protective oxide layer to be increased.

In a first aspect of the invention, the material contains a boride of the third constituent together with hafnium in metallic form or in the form of a carbide, a boride, or a nitride, or indeed a mixture of a plurality of these elements and/or these compounds.

In a second aspect of the invention, the material contains a nitride of said rare earth RE, said material also containing a hafnium boride and a non-oxide compound of hafnium, or indeed a mixture of a plurality of these compounds. Under such circumstances, although boron is not provided in independent manner, it is nevertheless possible to adjust the quantities of boron and of hafnium. By providing hafnium in the form of two compounds, one of which is a boride, it is possible firstly to adjust the quantity of boron by using the hafnium boride, and secondly to adjust the quantity of hafnium by using the second compound that may in particular be a nitride or a carbide.

In a third aspect of the invention, the material contains hafnium and a boride of rare earth RE or a hafnium carbide and a boride of rare earth RE. In particular, the material may contain hafnium and a rare earth boride $DyB_4$, where Dy corresponds to dysprosium, which is a rare earth of the lanthanide family or a carbide of hafnium and a rare earth boride $DyB_4$, where Dy corresponds to dysprosium which is a rare earth of the lanthanide family.

According to a particular characteristic of the invention, tantalum or a non-oxide compound of tantalum, or niobium or a non-oxide compound of niobium, or zirconium or a non-oxide compound of zirconium, or indeed a mixture of a plurality of these metals and/or compounds may also be added to the three above-defined constituents in order to provide an additional stable liquid phase.

The invention also provides a refractory part that can withstand high temperatures in an oxidizing atmosphere, the part being characterized in that it is constituted by a refractory material of the invention.

The invention also provides a thermostructural composite material part constituted at least in part by carbon and having a protective coating providing protection at high temperatures in an oxidizing medium, the part being characterized in that said protective coating is constituted by at least one refractory material of the invention. This part may in particular constitute a rocket engine component made of C/C composite material and having at least its inside surface provided with said protective coating.

The invention also provides a method of making a part out of refractory material that can withstand high temperatures in an oxidizing medium, the method being characterized in that it comprises:
  making a composition comprising at least:
    a first constituent corresponding to hafnium, or to a non-oxide compound of hafnium, or corresponding to a mixture of at least two metals and/or compounds selected from hafnium and/or a non-oxide compound of hafnium;
    a second constituent corresponding to boron or to a non-oxide compound of boron, or corresponding to a mixture of boron and a non-oxide compound of boron; and
    a third constituent corresponding to a rare earth RE or to a non-oxide compound of the rare earth RE, or corresponding to a mixture of rare earth RE and a non-oxide compound of the rare earth RE;
  said composition containing no silicon or compound of silicon; and
  shaping the composition and densifying said composition.

The invention also provides a method of making a protective layer that can withstand high temperatures in an oxidizing medium, the layer being made on a composite material part constituted at least in part by carbon, the method comprising:
  applying on the part a composition comprising at least:
    a first constituent corresponding to hafnium, or to a non-oxide compound of hafnium, or corresponding to a mixture of at least two metals and/or compounds selected from hafnium and/or a non-oxide compound of hafnium;
    a second constituent corresponding to the boron or to a non-oxide compound of boron, or corresponding to a mixture of boron and a non-oxide compound of boron; and a third constituent corresponding to a rare earth RE or to a non-oxide compound of the rare earth RE, or corresponding to a mixture of rare earth RE and a non-oxide compound of the rare earth RE;

said composition containing no silicon or silicon compound; and shaping the composition and densifying said composition.

In a first aspect of the invention, the composition contains a boride of the third constituent together with hafnium in metallic form or in the form of a carbide, a boride, or a nitride, or indeed a mixture of a plurality of these metals and/or these compounds.

In a second aspect of the invention, the composition contains a nitride of said rare earth RE, said material also containing a boride of hafnium and a non-oxide compound of hafnium, or a mixture of a plurality of these compounds.

In a third aspect of the invention, the composition contains hafnium and a boride of rare earth RE or a hafnium carbide and a boride of rare earth RE. The composition may in particular contain hafnium and a rare earth boride $DyB_4$, where Dy corresponds to dysprosium, which is a rare earth, or hafnium carbide and a rare earth boride $DyB_4$ where Dy corresponds to dysprosium, which is a rare earth.

In addition to the three components described above, the composition may contain tantalum or a non-oxide compound of tantalum, or niobium or a non-oxide compound of niobium, or zirconium or a non-oxide compound of zirconium, or indeed a mixture of a plurality of these metals and/or compounds.

According to a particular characteristic of the invention, in the methods of making a refractory material part and a protective coating for a part made of thermostructural composite material (e.g. C/C), the composition is densified by flash sintering or by spark plasma sintering (SPS).

BRIEF DESCRIPTION OF THE DRAWINGS

Other characteristics and advantages invention appear from the following description of particular embodiments of the invention given as nonlimiting examples and with reference to the accompanying drawings, in which.

DETAILED DESCRIPTION OF EMBODIMENTS

Figure 1A:
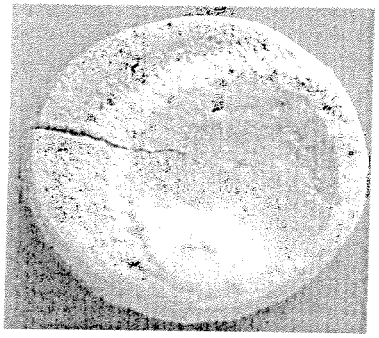
FIGS. 1A and 1B are photographs showing respectively a plan view and a fragmentary section of a C/C composite pellet covered in a protective material of the invention after the pellet has been exposed to a high-temperature heat flux in an oxidizing medium.

The invention proposes a novel refractory material suitable for withstanding temperatures higher than 2000° C. in an oxidizing medium as defined above by forming a structural system that generates a protective layer of oxides while it is in use.

The material of the invention may be used to form refractory parts that are for use under such conditions, e.g. such as vehicle heat shields for re-entry into the atmosphere. The material of the invention may also be used as a protective coating for thermostructural composite material parts containing at least some carbon, e.g. C/C composite parts, that are to be exposed to high temperatures (>2000° C.) in an oxidizing medium such as in particular the throats of rocket engine nozzles or portions of aeroengines, in particular of the turbojet type.

The refractory material of the invention contains at least three constituents. The first constituent corresponds to hafnium or to zirconium, or to a non-oxide compound of one of them, or indeed to a mixture of two or more of such metals and/or compounds. Zirconium is preferably used in a form other than metallic, since zirconium in metallic form presents low thermal stability. The second constituent corresponds to boron or to a non-oxide compound of boron, or indeed to a mixture of them. The third constituent corresponds to a rare earth RE, where the abbreviation RE designates a rare earth comprising yttrium (Y), scandium (Sc), and the lanthanides, or a non-oxide compound of rare earths RE, specifically a carbide, a boride, or a nitride of the rare earth, or indeed a mixture of the rare earths RE and a non-oxide compound of the rare earths RE. The rare earth is preferably used in a form other than metallic, since in metallic form, a rare earth presents low thermal stability.

The atomic ratio between the first constituent and the third constituent is strictly greater than 0 and less than or equal to 25 ($1^{st}$ constituent/$3^{rd}$ constituent >0 and ≤25), while the atomic ratio between the second constituent and the third constituent is strictly greater than 0 and less than or equal to 60 ($2^{nd}$ constituent/$3^{rd}$ constituent >0 and ≤60).

The material of the invention does not contain silicon or a compound of silicon, such as for example SiC, in order to avoid active oxidation of the material.

When provided in compound form, the three above-mentioned constituents are in a non-oxide form so that the protective refractory material of the invention forms an initial non-oxide system. Thus, before being used in a high-temperature oxidizing medium, the material of the invention does not contain any already-formed oxides, with these being generated only while the material is in use. Initially formed oxides, i.e. oxides already present in the material while it is being prepared, generally present a coefficient of expansion that is large and thermal conductivity that is low, and consequently they are sensitive to thermal shocks. During use of a material that originally contains such oxides, the temperature rises of the material will give rise to thermal shocks in the oxides, and that can lead to cracking and/or flaking in the material. With the material of the invention, such a drawback is avoided since the oxides are formed only during temperature rises while the material is being used in an oxidizing medium.

In use, i.e. in an oxidizing medium in temperature ranges that may extend from the few hundreds of degrees Celsius to more than 2000° C., the constituents of the material system form, on their own or between one another, protective oxides that enable the part or the protective coating constituted by the material of the invention to conserve mechanical integrity and a refractory nature.

As mentioned above, hafnium or zirconium are selected since they correspond to very good basic constituents for the system formed by the material of the invention, in particular because of the high melting temperatures of their oxides (about 3000° C.) and because of their great resistance to thermal shocks.

The inclusion of boron in the material system of the invention enables boron oxide $B_2O_3$ to be formed in liquid form that is suitable for sealing pores and cracks that can occur in the protective oxides of hafnium ($HfO_2$) or of zirconium ($ZrO_2$).

In accordance with the invention, silicon and any of its compounds are absent, and advantageously they are replaced in the protective material of the invention by the third constituent. The third constituent serves to confer and ensure a very good refractory nature for the material, since the oxide of this third constituent acts in the protective oxide layer containing an oxide of hafnium or of zirconium to form an oxide, a defined (or intermediate) compound, a solid solution, or a structure that makes it possible to increase the thermochemical stability of the protective oxide layer.

Among the rare earths suitable for forming a non-oxide system with zirconium, mention may be made in particular of: lanthanum (La); neodymium (Nd); samarium (Sm); europium (Eu); gadolinium (Gd); erbium (Er); dysprosium (Dy); lutetium (Lu); ytterbium (Yb); yttrium (Y) and holmium (Ho); and scandium (Sc). The oxides of these constituents have melting temperatures higher than 2000° C. They are capable of forming defined compounds with $B_2O_3$ at a temperature lower than 2000° C.

Furthermore, at temperatures higher than 2000° C., the oxides of the La, Nd, Sm, Eu, Er, and Y constituents present intermediate compounds with $ZrO_2$.

Among the rare earths that are suitable for forming a non-oxide system with hafnium, mention may be made in particular of: lanthanum (La); neodymium (Nd); samarium (Sm); europium (Eu); gadolinium (Gd); erbium (Er); dysprosium (Dy); lutetium (Lu); ytterbium (Yb); yttrium (Y); holmium (Ho); and thulium (Tm). The oxides of these constituents have melting temperatures higher than 2000° C. They are capable of forming defined compounds with $B_2O_3$ at a temperature lower than 2000° C. Furthermore, at temperatures higher than 2000° C., the oxides of the La, Nd, Sm, Eu, and Gd constituents present intermediate compounds with $HfO_2$.

The oxide of the third constituent may be in solid or liquid form and may optionally have defined compounds at low temperature with $B_2O_3$. The existence of defined compounds between the oxide of the added constituent and boron oxide at low temperature can give rise to a strong chemical affinity being conserved between these two compounds when in the liquid state at high temperature and can limit evaporation of the $B_2O_3$ phase.

Furthermore, tantalum or a non-oxide compound of tantalum, such as TaC, for example, or indeed niobium or a non-oxide compound of niobium, such as NbC, for example, or indeed zirconium or a zirconium compound when zirconium is not already present in the first constituent, or indeed a mixture of these metals and/or compounds, may also be added to the three above-mentioned constituents in order to provide an additional stable liquid phase in the system. Tests at high temperature in an oxidizing medium have shown that the liquid oxide $Ta_2O_5$ is thermally very stable. At least 50% or even 70% of the $Ta_2O_5$ that is formed remains in the condensed state at a blackbody temperature $Tbb=2250°$ C. The formation of liquid phase on the surface is limited, thereby helping to increase the refractory nature of the oxide layer.

The material of the invention may be made in particular from a composition comprising a mixture of powders of at least the three above-described constituents. By way of illustration, the characteristics of powders that are commercially available and suitable for use in making materials of the invention are listed in the table below.

| Compound | Supplier | Particle size (μm) | Purity (%) |
|---|---|---|---|
| Hf | Alfa Aesar | 44 | 99.6 |
| $HfB_2$ | Neyco | 44 | 99.9 |
| $ZrB_2$ | Neyco | 44 | 99.5 |
| HfC | Alfa Aesar | 44 | 99.5 |
| ZrC | ABCR Gmbh & Co | 44 | 99 |
| GdN | Neyco | 250 | $Gd_2O_3$ hydroxides of Gd |
| $GdB_6$ | Cerac | 44 | 99.9 |
| YbN | Neyco | 250 | $Yb_2O_3$ hydroxides of Yb |
| $DyB_4$ | Cerac | 250 | 99.5 |

The powder mixture, after shaping, e.g. by cold compacting in a mold (pelleting), is densified by flash sintering or by spark plasma sintering (SPS). Flash sintering or SPS is a method similar to conventional hot pressing, which may also be used for densifying the shaped composition. "Flash sintering" consists in heat treatment under pressure while passing an electric current that serves to consolidate the part by forming bonds between the grains without melting them completely. This welding achieved by diffusion of material is accompanied by densification, i.e. by a reduction in porosity, and by hardening, and it imparts cohesion to the shaped article.

The composition shaped to have the shape of the part that is to be made is inserted into an enclosure that enables uniaxial pressure to be applied during sintering. A device suitable for performing such flash sintering is sold in particular by the supplier Sumitomo Electric Industries and it enables the sample to be subjected to (3.3 millisecond (ms)) DC electric current pulses (typically 0-10 volts (V), 1 kiloamps (kA)-5 kA) while and applying a pressure of several tens of megapascals (up to 150 MPa) over a temperature range extending from ambient temperature up to 2000° C. Flash filtering is generally performed in a vacuum, but it is also possible to work in an inert atmosphere (nitrogen, argon).

The same sintering cycle may be used as a reference for densification of various compositions of the refractory material of the invention by flash sintering, only the final sintering temperature needs to be modified as a function of the refractive nature of the constituents being sintered.

By way of example, the temperature parameters selected for the sintering cycle may be: rising to 600° C. in 3 minutes (min), followed by rising to the sintering temperature at a rate of 100° C./min, followed by holding that temperature during 5 min, and finally dropping to 600° C. in 30 min, followed by turning off the heating.

During the cycle, a pressure of 100 MPa is applied progressively from the beginning of the temperature rise to 600° C. in order to close the majority of the remaining pores and avoid non-uniform densification in the material after sintering. Thus, as from the beginning of sintering, a generally dense material can be obtained in which contact between grains is good.

The controlled cooling allows residual stresses of thermal origin to relax and enables the structure of the phases present to change, while also avoiding the presence of cracks and microcracks in the material. The table below gives examples of the sintering atmosphere, of melting temperature values, and of sintering temperature values for some of the constituents used in the composition of materials of the invention.

| Compound | Tm (° C.) | $T_{sinter}$ (° C.) | Sintering atmosphere |
|---|---|---|---|
| Hf | 2222 | 1300 | vacuum |
| HfC | 3890 | 2000 | vacuum |
| $HfB_2$ | 3250 | 2000 | vacuum |
| ZrC | 3550 | 2000 | vacuum |
| $ZrB_2$ | 3060 | 2000 | vacuum |
| $DyB_4$ | >2000 | ≥1700 | vacuum |
| $GdB_6$ | >2000 | ≥1700 | vacuum |
| GdN | >1600 | 1600 | argon |

The molds and the pistons used are made of graphite and they are separated from the composition in the form of compacted powder by a sheet of graphite in order to avoid any adhesion.

When using flash sintering to make a protective coating around a part made of thermostructural composite material (e.g. C/C), the C/C composite part is placed in the sintering mold on a bed of powder (corresponding to the powder mixture of constituents making up the material of the invention), and it is then covered in the same powder so as to be completely centered within the part made by flash sintering. Nevertheless, if so desired, only a portion of the surface of the part made of thermostructural composite material (e.g. C/C) need be covered by the material of the invention, for example when only a portion of its surface needs to be protected.

Monolithic parts and protective coatings of refractive material that can withstand high temperatures in an oxidizing medium in accordance with the invention may also be made by standard sintering or by plasma spraying or by physical vapor deposition (PVD).

The following two tables gives examples of the compactness and of the phases identified by X-ray diffraction in the materials obtained from various powder compositions that were densified by flash sintering under the above-described operating conditions and with the sintering temperatures specified in the tables.

| Powder composition | (Hf, Zr/Dy) atomic ratio | $T_{sinter}$ (° C.) | Compactness (%) | Main diffracting phases |
|---|---|---|---|---|
| $Hf + DyB_4$ | 1.35 | ≥1300 | 85 | Hf, $DyB_4$, $HfB_2$, $DyB_2$ |
| $Hf + DyB_4$ | 2.7 | ≥1300 | 90 | Hf, $DyB_4$, $HfB_2$, $DyB_2$ |
| $Hf + DyB_4$ | 8.1 | ≥1300 | 93 | Hf, $DyB_4$, $HfB_2$ |
| $Hf + DyB_4$ | 24.3 | ≥1300 | 95 | Hf |
| $HfC + DyB_4$ | 1.35 | ≥1700 | 85 | HfC, $DyB_4$, $HfB_2$, $DyB_2$ (weak) |
| $HfC + DyB_4$ | 2.7 | ≥1700 | 85 | HfC, $DyB_4$, $HfB_2$ |
| $ZrC + DyB_4$ | 2.7 | ≥1700 | 84 | ZrC, $DyB_4$, $ZrB_2$, $DyB_2$ (weak) |
| $HfC + DyB_4$ | 8.1 | ≥1700 | 85 | HfC, $DyB_4$, $HfB_2$ (weak) |

| Powder composition | (Hf, Zr)/Gd atomic ratio | $T_{sinter}$ (° C.) | Compactness (%) | Main diffracting phases |
|---|---|---|---|---|
| $Hf + GdB_6$ | 2.7 | 1300 | 90 | Hf, $GdB_6$, $HfB_2$, $Gd_2B_5$ |
| $HfC + GdB_6$ | 2.7 | 1700 | 91 | HfC, $GdB_6$, $HfB_2$ |
| $ZrC + GdB_6$ | 2.7 | 1700 | 98 | $GdC_2$ ZrC, $GdB_6$, $ZrB_2$, $GdC_2$ |
| $HfC + GdB_6$ | 8.1 | 1700 | 90 | HfC, $HfB_2$, $GdC_2$ |

Tests

In order to verify the effectiveness of a refractory material of the invention, the following samples were made:

C/C composite pellets having a diameter of 10 millimeters (mm), a thickness of 2 mm, and a density of 1.2 grams per cubic centimeter ($g/cm^3$) with a protective coating of refractory material that can withstand high temperatures in an oxidizing medium in accordance with the invention being made thereon by flash sintering as described above, the samples ending up as pellets having a diameter of 15 mm and a thickness of 5 mm (Tests 1 and 2); and solid pellets of refractory material withstanding high temperatures in an oxidizing medium in accordance with the invention were made by flash sintering as described above, the samples being pellets having a diameter of 50 mm and a thickness of 5 mm (Tests 3 to 5).

The samples as made in this way were subsequently tested for oxidation in ambient air in a solar furnace in which they were subjected to a solar flux of 15.5 megawatts per square meter ($MW/m^2$) during a pause at maximum temperature lasting for 3 min.

Test 1

Figure 1B:

The table below and the photographs of FIGS. 1A and 1B show the results obtained for a sample comprising a C/C composite pellets having a protective coating of $Hf+DyB_4$ (2.7) material (i.e. a mixture of Hf and $DyB_4$ with a Hf/Dy atomic ratio equal to 2.7), the sample being shaped and tested under the conditions described above. In the table below, Tbb, Δm, Ec, and Eo correspond respectively to the blackbody temperature value of the exposure, to an indication of the change in mass, to the value of the thickness of the material consumed, and to the value of the thickness of the oxidized layer of the $Hf+DyB_4$ material on the C/C composite.

| Material | $Hf + DyB_4$ (2.7) |
|---|---|
| Tbb (° C.) | 2800 |
| Δm | Δm > 0 |
| Ec (mm) | 2.1 ± 0.2 |
| Eo (mm) | 0.3 ± 0.2 |

Test 2

Figure 2A:
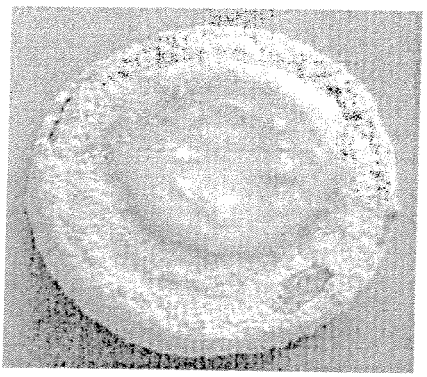
FIGS. 2A and 2B are photographs showing respectively a plan view and a fragmentary section of a C/C composite pellet covered in a protective material of the invention after the pellet has been exposed to a high-temperature heat flux in an oxidizing medium.
Figure 2B:
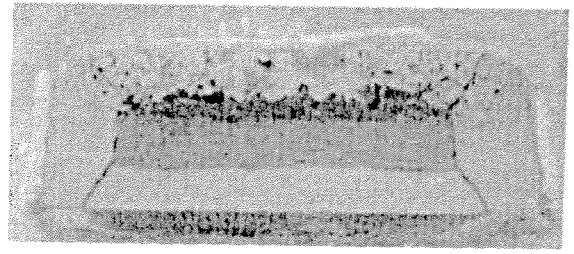

The table below and FIGS. 2A and 2B show the results obtained for a sample comprising a C/C composite pellets having a protective coating of $HfC+DyB_4$ (2.7) material (i.e. a mixture of Hf and $DyB_4$ with a Hf/Dy atomic ratio equal to 2.7), the sample being shaped and tested under the conditions described above. In the table below, Tbb, Δm, Ec, and Eo correspond respectively to the blackbody temperature value of the exposure, to an indication of the change in mass, to the value of the thickness of the material consumed, and to the value of the thickness of the oxidized layer of the $Hf+DyB_4$ material on the C/C composite.

| Material | $HfC + DyB_4$ (2.7) |
|---|---|
| Tbb (° C.) | 2800 |
| Δm | Δm < 0 |
| Ec (mm) | 2.2 ± 0.2 |
| Eo (mm) | 0.5 ± 0.2 |

As can be seen both on the photographs and from the results in terms of the thickness of material consumed in tests 1 and 2, the degradation of the surface coating (i.e. the face of the sample that was exposed to solar flux) is limited, thereby demonstrating the strength and the reliability of the protection provided by the material in an oxidizing atmosphere at high temperature for an exposure of duration not less than 3 min at the maximum temperature that was reached (specifically 2800° C.). These tests also show the excellent protection constituted by the coating, since the C/C composite samples remained intact after the sample had been exposed to solar flux in an oxidizing medium.

Concerning the ability to withstand high temperatures in an oxidizing medium, the same results can be obtained with similar samples formed entirely out of the protective materials of tests 1 and 2.

Test 3

Figure 3:
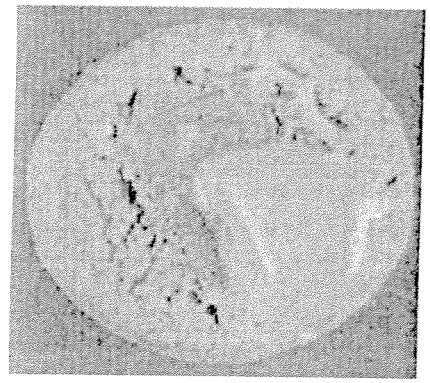
FIG. 3 is a photograph showing a plan view of a pellet made with a material of the invention after the pellet has been exposed to a high-temperature heat flux in an oxidizing medium.

The table below and FIG. 3 show the results obtained for a sample comprising a monolithic pellet of Hf+GdB$_6$ (2.7) material (i.e. a mixture of Hf and GdB$_6$ with a Hf/Gd atomic ratio equal to 2.7), the sample being shaped and tested under the conditions described above. In the table below, Tbb, Δm, Ec, and Eo correspond respectively to the blackbody temperature value of the exposure, to an indication of the change in mass, to the value of the thickness of the material consumed, and to the value of the thickness of the oxidized layer of the Hf+GdB$_6$ material.

| Materials | Hf + GdB$_6$ (2.7) |
|---|---|
| Tbb (° C.) | 2150 |
| Δm | Δm > 0 |
| Ec (mm) | 0.8 ± 0.1 |
| Eo (mm) | 1.5 ± 0.2 |

Test 4

Figure 4:
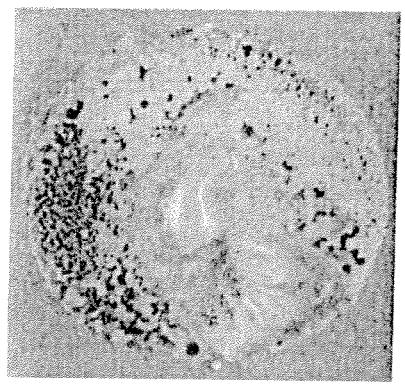
FIG. 4 is a photograph showing a plan view of a pellet made with a material of the invention after the pellet has been exposed to a high-temperature heat flux in an oxidizing medium.

The table below and FIG. 4 show the results obtained for a sample comprising a monolithic pellet of HfC+GdB$_6$ (2.7) material, the sample being shaped and tested under the conditions described above. In the table below, Tbb, Δm, Ec, and Eo correspond respectively to the blackbody temperature value of the exposure, to an indication of the change in mass, to the value of the thickness of the material consumed, and to the value of the thickness of the oxidized layer of the HfC+GdB$_6$ material.

| Materials | HfC + GdB$_6$ (2.7) |
|---|---|
| Tbb (° C.) | 2150 |
| Δm | Δm < 0 |
| Ec (mm) | 0.65 ± 0.05 |
| Eo (mm) | 0.85 ± 0.1 |

Test 5

Figure 5:
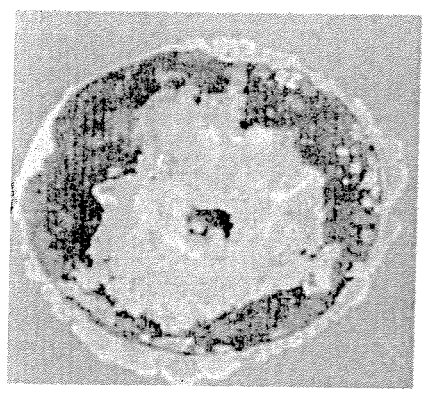
FIG. 5 is a photograph showing a plan view of a pellet made with a material of the invention after the pellet has been exposed to a high-temperature heat flux in an oxidizing medium.

The table below and FIG. 5 show the results obtained for a sample comprising a monolithic pellet of ZrC+GdB$_6$ (2.7) material, the sample being shaped and tested under the conditions described above. In the table below, Tbb, Δm, Ec, and Eo correspond respectively to the blackbody temperature value of the exposure, to an indication of the change in mass, to the value of the thickness of the material consumed, and to the value of the thickness of the oxidized layer of the ZrC+GdB$_6$ material.

| Materials | ZrC + GdB$_6$ (2.7) |
|---|---|
| Tbb (° C.) | 2050 |
| Δm | Δm < 0 |
| Ec (mm) | 0.7 ± 0.1 |
| Eo (mm) | 0.5 ± 0.1 |

As can be seen from the results in terms of material thickness consumed in tests 3 to 5, the degradation of the surface coating (i.e. the face of the sample that was exposed to solar flux) is limited, thereby demonstrating the strength and the reliability of the protection provided by the material in an oxidizing atmosphere at high temperature for an exposure of duration not less than 3 min at the maximum temperature that was reached (specifically in the range 2050° C. to 2150° C.). It can also be seen in the photographs of FIGS. 3 to 5 that the samples withstood the tests very well since they retained their structural integrity.

At very high temperature, adding gadolinium in boride form into the system makes it possible to provide a liquid phase in the oxidized system. This liquid phase can seal the pores at the end surface of the porous refractory skeleton of HfO$_2$ at a black-body temperature not less than 2150° C. or at a real temperature higher than 2300° C. This can thus serve to limit the diffusion of oxygen through the oxide layer.

The invention claimed is:

1. A composite material part constituted at least in part by carbon and having a protective coating providing protection at high temperatures in an oxidizing medium, wherein said protective coating is constituted by at least one refractory material that can withstand high temperatures in an oxidizing medium, the refractory material comprising:
    hafnium, or a non-oxide compound of hafnium, or a mixture of hafnium and a non-oxide compound of hafnium;
    boron or a non-oxide compound of boron, or a mixture of boron and a nonoxide compound of boron; and
    a constituent corresponding to a rare earth element RE or a to non-oxide compound of the rare earth element RE, or corresponding to a mixture of rare earth element RE and a non-oxide compound of the rare earth element RE, where RE is selected from scandium, yttrium, and the lanthanides; and
    said material containing neither silicon nor a compound of silicon.

2. A composite material part according claim 1, wherein the refractory material contains a boride of said rare earth element RE and contains at least hafnium in metallic form, or hafnium in carbide or nitride or boride form.

3. A composite material part according to claim 1, wherein the refractory material contains a nitride of said rare earth element RE, said material also containing at least one boride of hafnium and at least one non-oxide compound of hafnium.

4. A composite material part according to claim 1, wherein the refractory material contains hafnium and a rare earth boride DyB4 where Dy corresponds to dysprosium, which is a rare earth, or contains a carbide of hafnium and a rare earth boride DyB4 where Dy corresponds to dysprosium, which is a rare earth.

5. A composite material part according to claim 1 wherein the refractory material further comprises at least tantalum or a non-oxide compound of tantalum, or niobium or a non-oxide compound of niobium, or zirconium or a non-oxide compound of zirconium.

6. A composite material part according to claim 1, constituting a rocket engine component made of thermostructural composite material and having at least its inside surface provided with said protective coating.

7. A method of making a part out of refractory material that can withstand high temperatures in an oxidizing medium, the method comprising the steps of:
    making a composition comprising at least:
    hafnium, or a non-oxide compound of hafnium, or a mixture of hafnium and a non-oxide compound of hafnium;
    boron or a non-oxide compound of boron, or a mixture of boron and a nonoxide compound of boron; and
    a constituent corresponding to a rare earth element RE or to a non-oxide compound of the rare earth element RE, or corresponding to a mixture of rare earth element RE and a non-oxide compound of rare earth element RE, where RE is selected from scandium, yttrium, and the lanthanides;

wherein the composition contains (i) a nitride of said rare earth element RE and at least one boride of hafnium and at least one non-oxide compound of hafnium, or (ii) hafnium and a boride of rare earth element RE, or (iii) a hafnium carbide and a boride of rare earth element RE;

said composition containing no silicon or compound silicon; and shaping the composition and densifying said composition.

8. A method according to claim 7, wherein the composition contains said nitride of said rare earth elemen RE, and said at least one boride of hafnium and said at least one non-oxide compound of hafnium.

9. A method according to claim 7, wherein the composition contains hafnium and said boride of rare earth element RE or said hafnium carbide and said boride of rare earth element RE.

10. A method according to claim 7, wherein the composition further comprises at least tantalum or a non-oxide compound of tantalum, or niobium or a non-oxide compound of niobium, or zirconium or a non-oxide compound of zirconium.

11. A method according to claim 7, wherein said composition is densified by flash sintering.

12. A method of making a protective layer that can withstand high temperatures in an oxidizing medium, the layer being made on a composite material part constituted at least in part by carbon, said method comprising the steps of:

applying on the part a composition comprising at least:

hafnium, or a non-oxide compound of hafnium, or a mixture of hafnium and a non-oxide compound of hafnium;

boron or a non-oxide compound of boron, or a mixture of boron and a non-oxide compound of boron; and a constituent corresponding to a rare earth element RE or to a non-oxide compound of a rare earth element RE, or corresponding to a mixture of rare earth element RE and a non-oxide compound of the rare earth element RE, where RE is selected from scandium, yttrium, and the lanthanides;

said composition containing no silicon or silicon compound; and shaping the composition and densifying said composition.

13. A method according to claim 12, wherein the composition contains a boride of said rare earth element RE and at least hafnium in metallic form or hafnium in carbide, or nitride, or boride form.

14. A method according to claim 12, wherein the composition contains a nitride of said rare earth element RE, and at least one boride of hafnium and at least one non-oxide compound of hafnium.

15. A method according to claim 12, wherein the composition contains hafnium and a rare earth boride DyB4, where Dy corresponds to dysprosium, which is a rare earth, or a carbide of hafnium and a rare earth boride DyB4 where Dy corresponds to dysprosium, which is a rare earth.

16. A method of using a part at a temperature higher than 2000° C. in an oxidizing medium, the method comprising:

providing the part, the part being a refractory part or a composite material part; and using said refractory part or said composite material part under a temperature higher than 2000° C. in an oxidizing medium, wherein said refractory part is constituted by a refractory material that can withstand high temperatures in the oxidizing medium, and said composite material part constituted at least in part by carbon and having a protective coating providing protection at said high temperatures in the oxidizing medium, wherein said protective coating is constituted by at least the refractory material, the refractory material comprising:

hafnium, or a non-oxide compound of hafnium, or a mixture of hafnium and a non-oxide compound of hafnium;

boron or a non-oxide compound of boron, or a mixture of boron and a nonoxide compound of boron; and a constituent corresponding to a rare earth element RE or a to non-oxide compound of the rare earth element RE, or corresponding to a mixture of rare earth element RE and a non-oxide compound of the rare earth element RE, where RE is selected from scandium, yttrium, and the lanthanides; and said material containing neither silicon nor a compound of silicon.

17. A method according to claim 16, wherein the refractory material contains a boride of said rare earth element RE and at least hafnium in metallic form, or hafnium in carbide or nitride or boride form.

18. A method according to claim 16, wherein the refractory material contains a nitride of said rare earth element RE, said material also containing at least one boride of hafnium and at least one non-oxide compound of hafnium.

19. A method according to claim 16, wherein the refractory material contains hafnium and a rare earth boride DyB4, where Dy corresponds to dysprosium, which is a rare earth, or a carbide of hafnium and a rare earth boride DyB4 where Dy corresponds to dysprosium, which is a rare earth.

20. A method according to claim 16, wherein the refractory material further comprises at least tantalum or a non-oxide compound of tantalum, or niobium or a non-oxide compound of niobium, or zirconium or a non-oxide compound of zirconium.

* * * * *